ANALOG-DIGITAL CONVERTER

Original Filed June 25, 1964 6 Sheets-Sheet 1

INVENTOR.
ROBERT Z. GELLER
BY W. E. Beatty
ATTORNEY

ANALOG-DIGITAL CONVERTER

Original Filed June 25, 1964

INVENTOR.
ROBERT Z. GELLER
BY W. E. Beatty
ATTORNEY

ANALOG-DIGITAL CONVERTER

Original Filed June 25, 1964 6 Sheets-Sheet 3

INVENTOR.
ROBERT Z. GELLER
BY W. E. Beatty
ATTORNEY

ANALOG-DIGITAL CONVERTER

Original Filed June 25, 1964

6 Sheets-Sheet 4

INVENTOR.
ROBERT Z. GELLER
BY W. E. Beatty
ATTORNEY

ANALOG-DIGITAL CONVERTER

Original Filed June 25, 1964 6 Sheets-Sheet 5

INVENTOR.
ROBERT Z. GELLER
BY W. E. Beatty
ATTORNEY.

INVENTOR.
ROBERT Z. GELLER
BY W. E. Beatty
ATTORNEY

United States Patent Office

Re. 26,451
Reissued Sept. 3, 1968

26,451
ANALOG-DIGITAL CONVERTER

Robert Z. Geller, Wantagh, N.Y., assignor to Inductosyn Corporation, Carson City, Nev., a corporation of Nevada Original No. 3,315,253, dated Apr. 18, 1967, Ser. No. 377,872, June 25, 1964. Application for reissue Sept. 28, 1967, Ser. No. 675,258
5 Claims. (Cl. 340—347)

Matter enclosed in heavy brackets [ ] appears in the original patent but forms no part of this reissue specification; matter printed in italics indicates the additions made by reissue.

The invention relates to an analog-digital converter, and more particularly to improvements in the analog-digital converter described and claimed in application S.N. 222,151, filed Sept. 7, 1962, by applicant and another, now Patent No. 3,191,010. In that patent application, as in the instant application, the converter employs coarse and fine data transmission elements in the form of position measuring transformers having relatively movable members, one of the members having polyphase windings, the other having a single phase winding. The polyphase windings constitute the input and are relatively stationary, whereas the single phase windings are relatively movable and are driven by a mechanical analog in the form of a shaft or linear drive and provide a phase sensitive control signal. The coarse and fine movable transformer elements run at the same speed as the mechanical analog to be digitized. The fine transformer is preferably in the form of an Inductosyn (Trademark), whereas the coarse transformer may be a resolver, the fine transformer having a large number of poles, here shown for example, as 720 poles, the resolver having a smaller number of poles such as 2. This is appropriate to a 360 degree rotation, 6 digit, degrees and decimal parts system, although other systems such as a binary system, may be employed.

One object of the present invention is to improve the coarse-fine correlation. Another object is to reduce an ambiguity in the fine count due to the use of separate coarse and fine clock generators. Separate clocks are used for the coarse and fine because the 1.8 megacycle frequency used for the coarse supply cannot be conveniently generated by count down from the 10 megacycle frequency of the fine clock.

The present application, as described and claimed in the copending application, referred to above, employs a clock pulse generator, which is the coarse clock in the present case, for supplying pulses to a frequency divider having an output of sub harmonic frequency as an input to a polyphase generator having as outputs polyphase signals with time phase different for inputs to the polyphase windings of the Inductosyn and resolver and a reference signal as an input to a first null crossing detector having an output of a first control signal, a second null crossing detector having an input of the phase-sensitive relative position signal and an output of a second control signal, and a gate having inputs of the clock pulses and the first and second control signals, the gate having an output of a number of clock pulses representing a digital number corresponding to the time difference between the first and second control signals.

The coarse-fine correlation is improved according to the present invention by biasing the coarse null crossing detector by a voltage proportional to the fine count to automatically retard the advance of the coarse stop pulse until each Inductosyn cycle is traversed.

The ambiguity in the fine count is reduced by over-resolution of the fine count by a certain factor and by associating with the counter a means to reduce the pulse input to the fine counter by the same factor.

A feature of the invention relates to arranging the movable members of the coarse and fine position measuring transformers on the shaft or other mechanical analog to be digitized, the fine transformer having a large number of poles and preferably being in the form of an Inductosyn, while the coarse transformer has a smaller number of poles and may be a resolver. The ratio of the fine-to-coarse pole number depends on the type of calibration system used, this ratio being 360 in the case of the 360 degree rotation, 6 digit, degrees and decimal parts system illustrated.

A further feature of the invention relates to a delay line for setting the start signal for the coarse gate to occur midway of consecutive coarse pulses.

For further details of the invention, reference may be made to the drawings wherein FIGS. 1A and 1B show a schematic analog-digital converter system according to the invention.

Figure 1A:
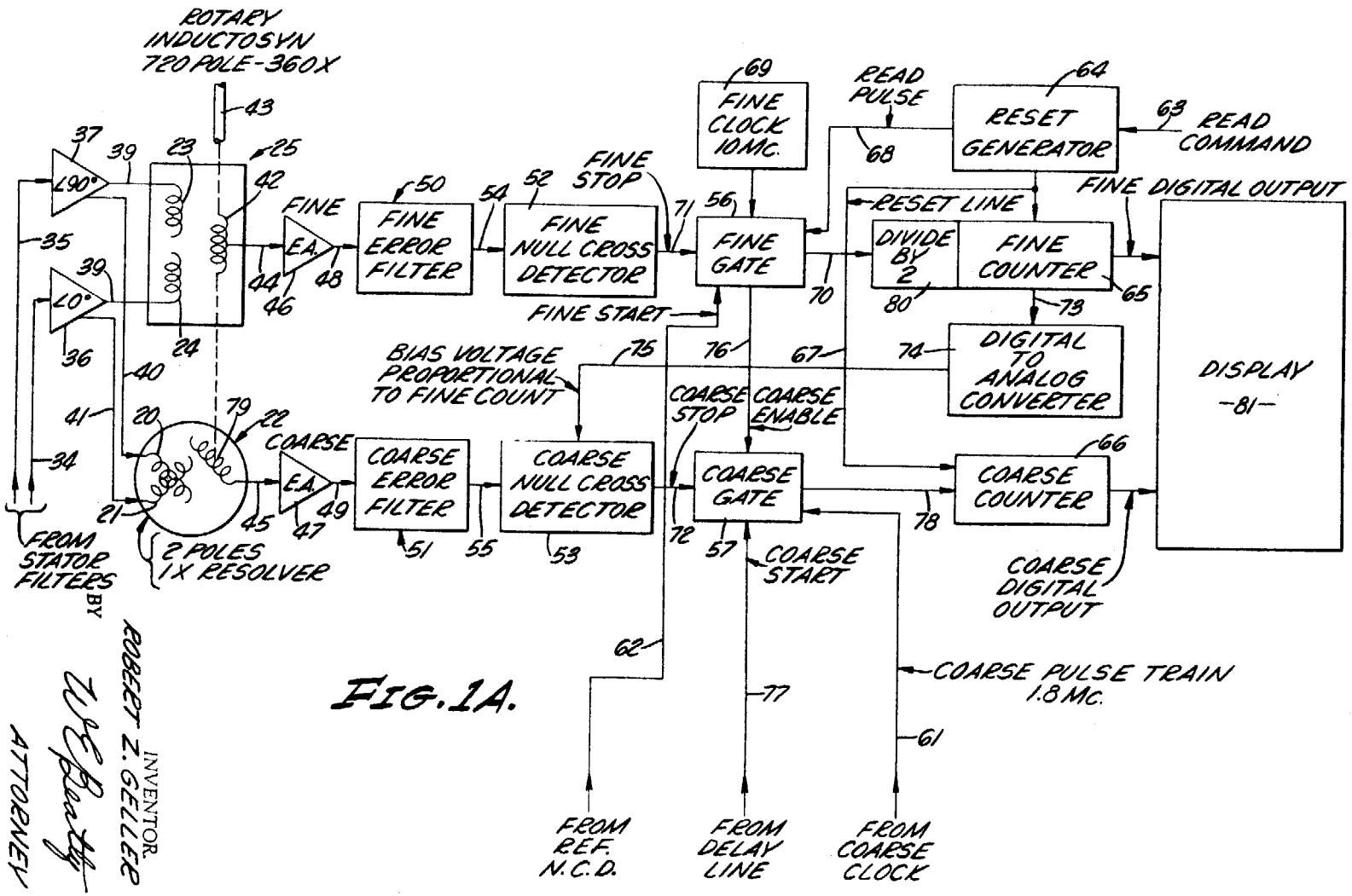
Figure 1B:
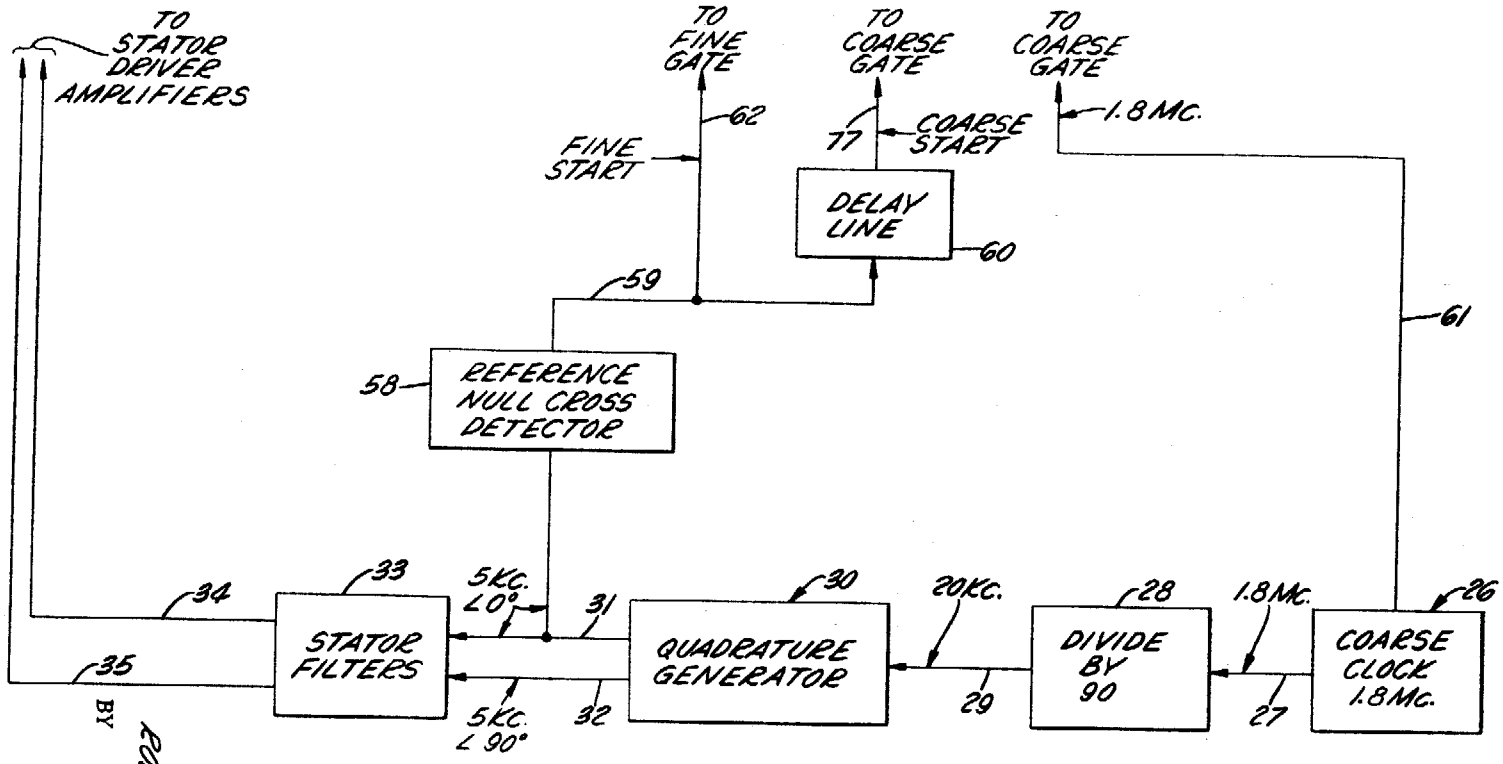

Referring in detail to the drawings, polyphase excitation for the polyphase stator windings 20, 21 of the resolver 22 and polyphase windings 23, 24 of the Inductosyn 25 is provided by digital count down from the system coarse clock 26 in FIG. 1B. The coarse clock 26 is fed via line 27 to frequency divider 28 where it is divided by 90 to a resultant 20 kilocycle pulse train. This 20 kc. pulse train is fed via line 29 to the quadrature generator 30 which produces 5 kilocycle angle zero degree and 90 degree square waves. The square waves are then fed via lines 31 and 32 to the stator filters No. 33 which alter the square waves to sine waves. The sine waves are fed via lines 34 and 35 to the stator driver amplifiers 36 and 37 in FIG. 1A. Lines 38 and 39 feed the sine wave outputs angle zero degrees and angle 90 degrees to the Inductosyn stator 23, 24. Lines 40 and 41 apply the same voltage to the 1 speed resolver 22. The output of the rotor 42 of the Inductosyn 25 will be a constant amplitude sine wave whose phase will vary 360 electrical degrees for each 1 degree of mechanical rotation of the input shaft 43. The output of the resolver 22 will be a constant amplitude sine wave whose phase will vary 360 electrical degrees for each 360 mechanical degrees of rotation of the input shaft 43. These sine waves are fed via line 44 for the fine channel and line 45 for the coarse channel to the fine and coarse error amplifiers 46 and 47 respectively. The outputs of these amplifiers 46, 47 are fed via lines 48 and 49 to the system fine and coarse error filters 50 and 51 respectively, and thence to the system fine and coarse null cross detectors 52 and 53 via lines 54 and 55. The null cross detectors 52 and 53 provide a pulse output at the zero crossing of the system sine waves. These output pulses are used as stop pulses for the fine gate 56 and for the coarse gate 57. The fine stop pulse is supplied via line 71 from the fine null cross detector 52 to fine gate 56. The coarse stop pulse is supplied via line 72 from coarse null cross detector 53 to coarse gate 57. Correlation of the coarse and fine channels of the system is provided by using the angle 0 degree digital square wave, line 31 for the system start pulses. This square wave is fed to the reference null cross detector 58 where a pulse is produced at the square wave zero crossing. The output pulse of the reference null cross detector 58 is fed via line 59 to the delay line 60. The delay line 60 is adjustable so that the system coarse start pulse can be set midway between two consecutive pulses of the coarse pulse train supplied over line 61 from the coarse clock 26. In this way, the coarse start pulse always occurs at a halfway point in the coarse pulse spacing. The stop pulse from reference null cross detector 58 is also applied as the fine start pulse to the fine gate 56 via line 62. When a read command is received via line 63, the reset generator 64 generates a pulse which resets the fine and coarse counters 65, 66 to zero via line 67. Another pulse at the end of the reset pulse is also generated in reset generator 64. This is known as a read pulse and is applied via line 68 to fine gate 56. This enables the next fine start pulse line 62 to open the fine gate 56. Clock pulses from the fine clock 69 are fed via the fine gate 56 and via line 70 to the fine counter 65. The fine counter 65 indexes until the next fine null cross detector pulse appears at line 71 and closes the fine gate 56. The fine count has now accumulated and is proportional to the phase position of the fine error sine wave with respect to the angle zero degrees digital square wave. The output of the last decade, that is the tenth degree decade of the fine counter 65 is fed via line 73 to the digital-to-analog converter 74. The digital-to-analog converter 74 generates a D.C. voltage proportional to the count registered in said decade. This D.C. voltage is applied via line 75 to the course null cross detector 53. This voltage offsets the firing point of the coarse null cross detector 53 a sufficient amount to overcome the coarse analog phase advance, thereby holding the coarse stop pulse in line 72 at the last degree increment of system travel. When the fine count reaches zero, indicating that 1 degree has been traversed, the bias in line 75 is removed and the coarse stop pulse in line 72 increments ahead to pick up an additional count in coarse. When the fine gate 56 closed, as previously described, the fine stop pulse in line 71 was transmitted via line 76 to the coarse gate 57, thereby enabling the coarse gate 57 to accept the next referenced null cross detector pulse, line 77, from the delay line 60. This opens the coarse gate 57, thereby allowing the coarse 1.8 mc. pulse train to be transmitted via line 61, through the coarse gate 57 and via line 78 to the coarse counter 66. The next coarse stop pulse, line 72, from null cross detector 53, closes the coarse gate 57 and stops the coarse count. The fine and coarse counters 65 and 66 now contain a digital count proportional to the phase angle existing between the angle zero degrees square wave and the phase shifted sine waves from the rotor output in lines 44 and 45 of the Inductosyn 25 and resolver 22. The count is, therefore, a digital readout of the input system shaft angle of shaft 43 on which both the Inductosyn rotor 42 and the resolver rotor 79 are mounted. Inductosyn 25 has 720 poles, commonly referred to as 360 speed, resolver 22 having 2 poles and being 1 speed. The speed ratio is 360. The system stores this count until another read command is applied on line 63.

It will be noted that separate clocks 26 and 69 are used for coarse and fine. This is necessary because the 1.8 megacycle coarse frequency cannot be conveniently generated by count down from the 10 megacycle fine clock. The system start pulses are not synchronous with the fine clock. This will ordinarily introduce an extra count ambiguity in fine. However, using 5 kc. excitation and a 10 megacycle fine clock results in over resolution of the fine system by a factor of 2, that is, the preliminary fine resolution is actually .0005 degree. This over-resolution is not displayed or furnished as a portion of the fine readout but is used only to determine the fine count to greater accuracy, the final resolution being .001 degree. A divide by 2 circuit indicated at 80 is included in front of the fine counter 65. This is actually part of fine counter 65. This results in a reduction of a fine count ambiguity from 2 counts to 1 count.

Figure 2:
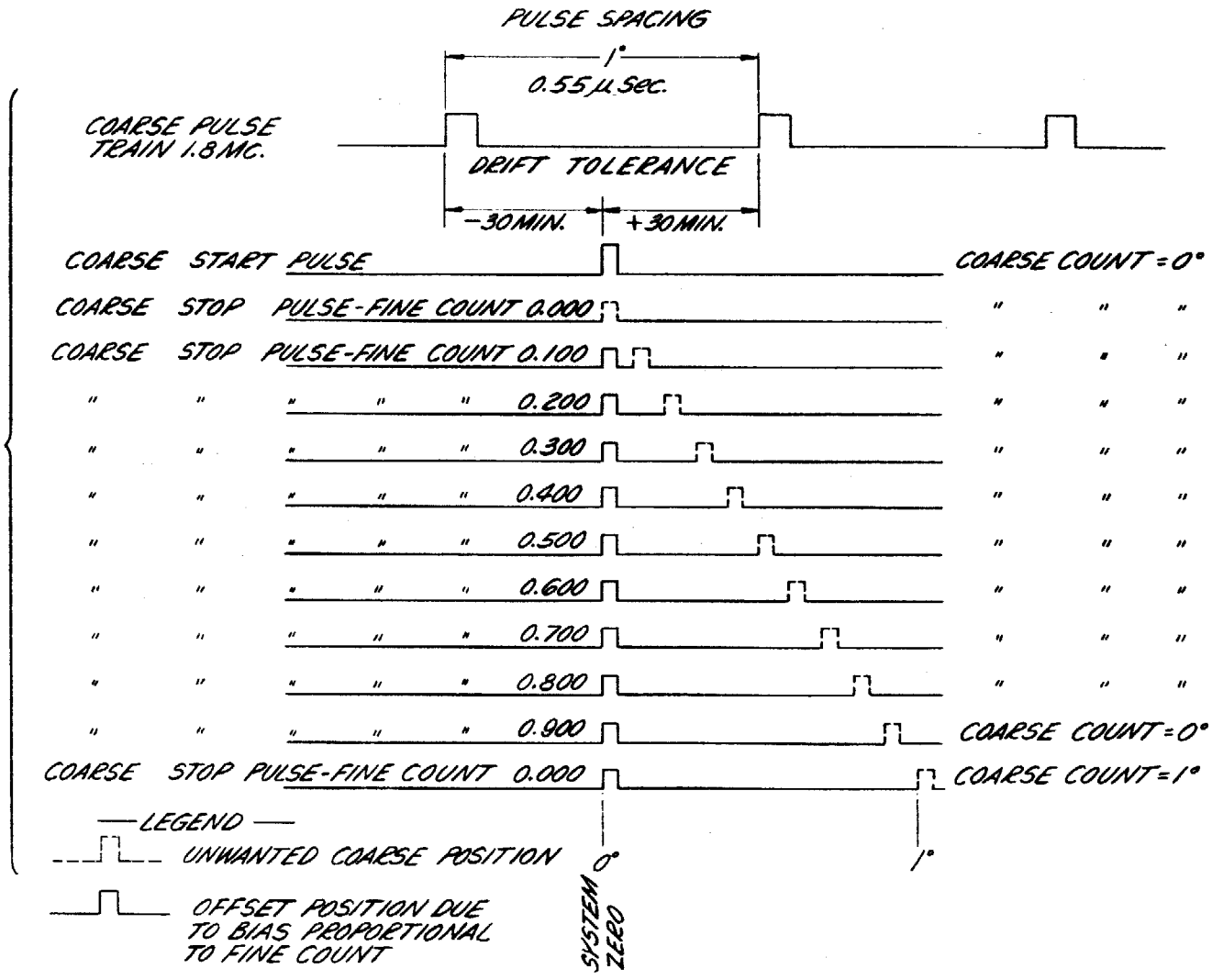
FIG. 2 is a pulse timing diagram of the system.

FIG. 2 is a pulse timing diagram of the system. Line 1 on FIG. 2 is the 1.8 megacycle coarse pulse train. In order to resolve 1 degree increments with a five kilocycle excitation system, 1.8 megacycles is the required coarse frequency. Line 2 shows the system coarse start pulse which is set by digital means (adjustable delay line 60 FIG. 18) to occur midway between any two consecutive pulses of the coarse pulse train in line 61. Lines 3 through 13 show the position of the system coarse stop pulse. The pulse represented with dotted line depicts the analog position of the coarse stop pulse where it would be without the bias in line 75. The pulse shown in solid line is the actual system coarse stop pulse when using bias 75. The positions are shown for fine count increments of .100, that is, for each tenth of a degree. The digital-to-analog bias is varied in tenth degree steps. It can be seen by examining lines 3 through 13 in FIG. 2, that although the system analog coarse stop pulse position advances with system rotation, it is offset to the zero position of the system by a voltage proportional to the fine count. Thus the offset bias increases in tenth degree steps through .9 degree. When the Inductosyn 25 transfers from .999 to 1.000 this bias is removed, that is, the ramp voltage in line 75 drops to zero and the system stop pulse in line 72 is allowed increment ahead to the natural but unwanted analog coarse position. This cycle repeats itself throughout the entire 360 degree rotation possibility of the system. If the diagram were continued, it would show a coarse stop pulse held in the 1 degree position until the fine count had again traversed through .999 and gone over to zero. The coarse stop pulse would then increment ahead to the 2 degree position. The offset bias voltage in line 75 is obtained by digital to analog conversion 74 of the final decade or tenth degree increment stage of the fine counter 65. A ramp voltage is generated by resistive mixing of the logic zero output levels of this last decade. Thus a D.C. voltage proportional to the fine count in 0.1° steps is available to bias the coarse null crossing detector 53. The bias alters the firing point of the coarse NCD 53 from zero on the coarse sine wave to the voltage point which will correspond to the time position desired.

This technique is not limited to a degrees and decimal parts system, but can be used as a coarse-fine correlation method with Industosyns of other types such as the binary or the 360 or 720 pole in a degrees, minutes and seconds system. In the binary system, the ramp would be generated from the last four binary stages of the fine counter. In a degrees, minutes and seconds system, the ramp would be generated from the most significant digit of the minutes portion of the fine counter. Using the linear Inductosyn with a tenth inch fine cycle, the ramp would be generated from the counter representing the hundredth of an inch cycle. Thus the system is flexible and generally applicable in shaft angle or linear digital readout techniques.

The counters 65 and 66 may act as inputs to a suitable display 81.

Figure 3:
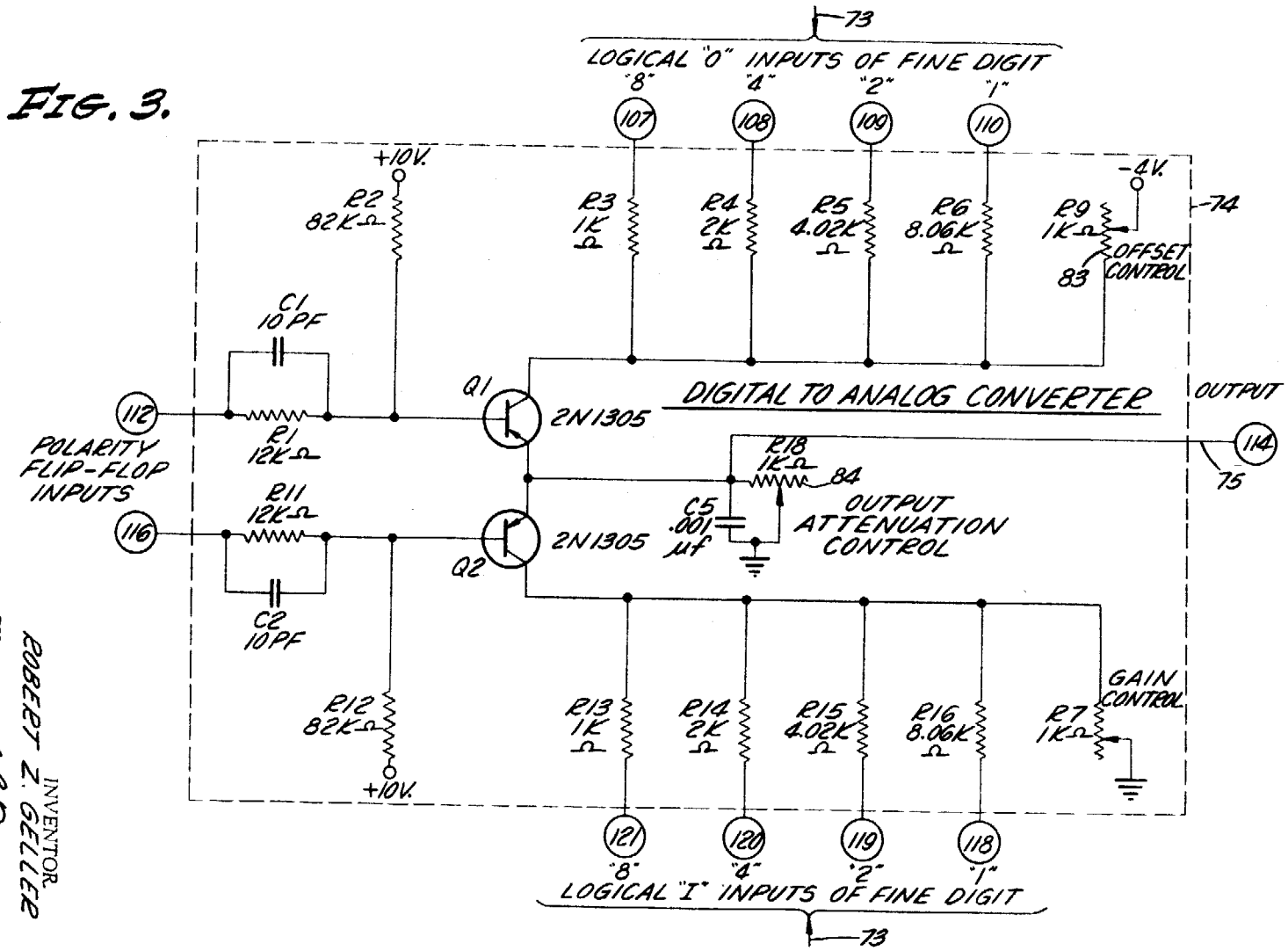
FIG. 3 is a schematic circuit of the digital to analog converter of FIG. 1A.

FIG. 3 shows the circuit of the digital-analog converter 74 used to develop the bias voltage. Numbers inside the circles indicate pin connections on the circuit board. This particular circuit provides biasing for plus or minus counting from a particular reference zero. For systems where only one direction of readout is called for, then one-half of the circuit is used. Pins 112 and 116 are used to control the direction sense of the bias voltage that is developed.

Figure 5:
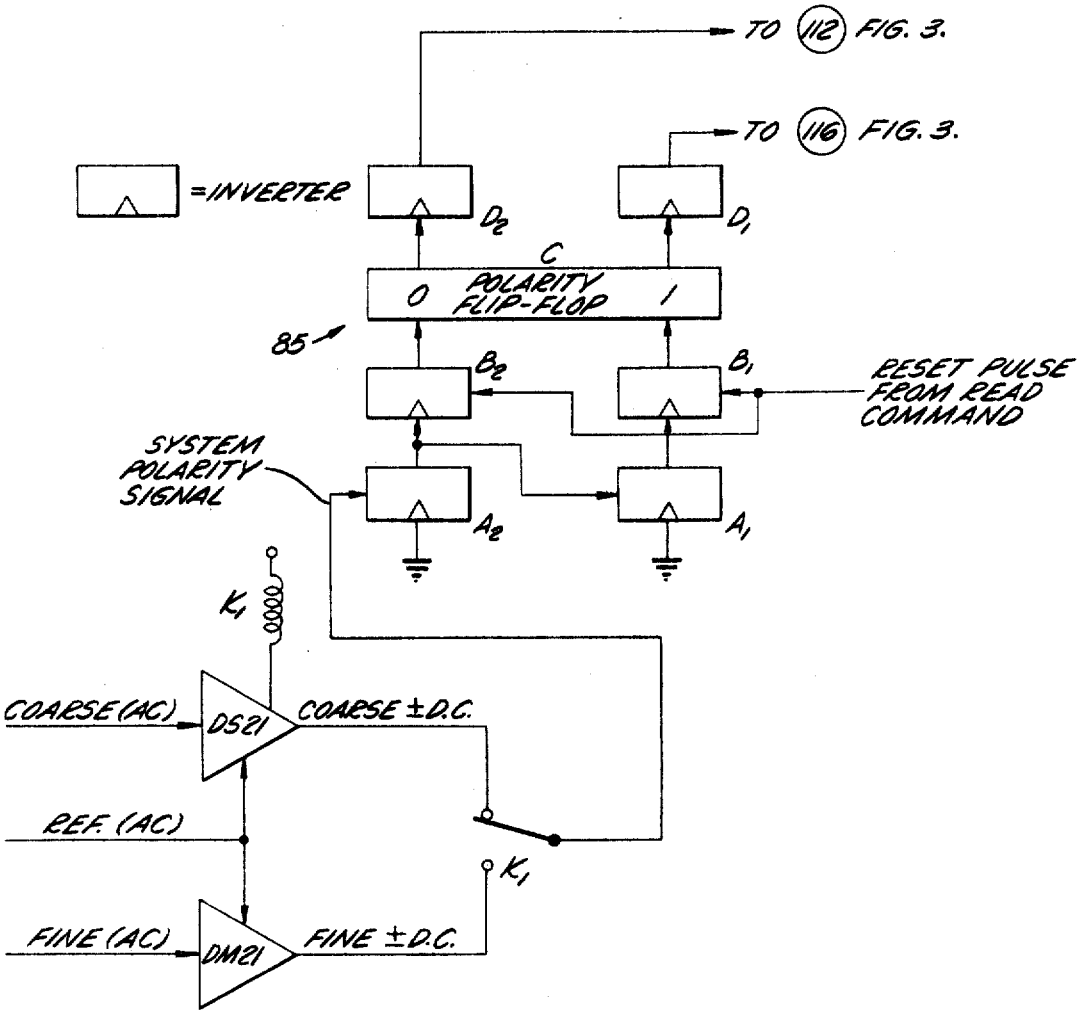
FIG. 5 is a schematic circuit diagram of the polarity flip-flop inputs for FIG. 3.

Bias voltages from the circuit of FIG. 5 are applied to pins 112 and 116 of FIG. 3 to activate one half of the circuit and inactivate the other half.

Zero volts applied to pin 112 or 116 will inactivate the following circuitry, and −4 volts applied to pin 112 or 116 activates the following circuitry.

In FIG. 5, the state of the flip-flop C is controlled by the polarity of error phase detectors DS21 and DM21.

This is used in a system that requires counting forward or backward (+ or −) from a reference zero. In this case, the converter output must have a + or − polarity as a function of the direction of count.

When a readout system is required to have only one readout polarity, then only one circuit is activated at all times by applying a fixed −4 volt bias at pin 112 or 116.

In FIG. 3, the output of the most significant fine digit is applied at pins 107 and 121. The output of the next most significant fine digit is applied at pins 108 and 120, etc. The analog value attributed to each digit is a function of its digital weight. The same logical 0 (or logical 1) voltage is applied at all terminals. There, the summing resistors are inversely proportional to the weight of the digit associated with it. Thus:

$$R3=\frac{R4}{2}\ R4=\frac{R5}{2}\ R5=\frac{R6}{2}$$

This would be precisely correct if the summing junction is a zero impedance point circuit. Since this is not the case in the circuit shown, slight adjustments from the theoretical values have been shown, i.e., $$R5=4.02K\ R6=8.06K$$

Although it is not shown, it is apparent that increased resolution can be obtained by increasing the number of fine digits to be converted.

Figure 4:
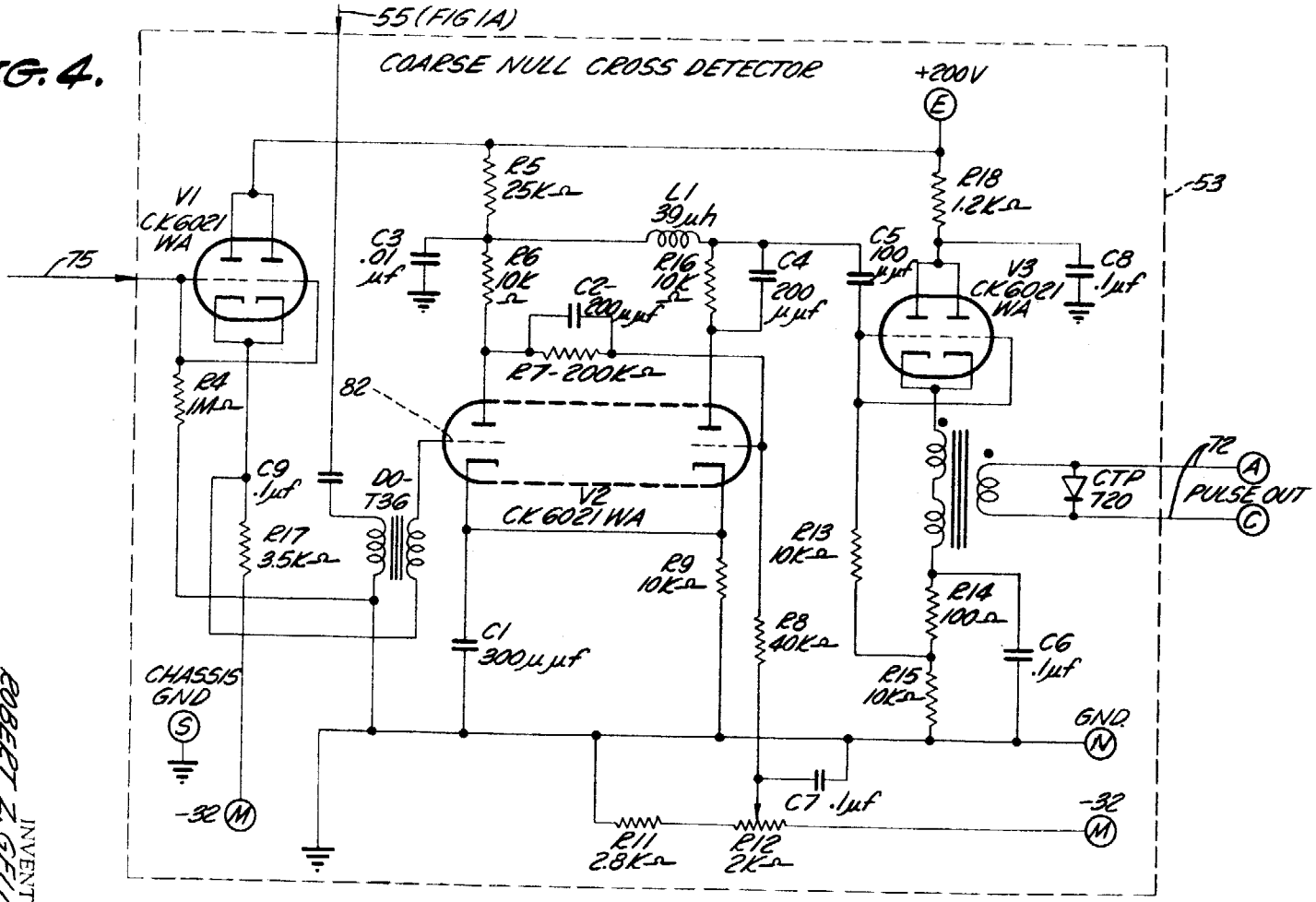
FIG. 4 is a schematic circuit diagram of the coarse null cross detector of FIG. 1A.

The output 75 of the digital-analog converter 74 is connected to the input of tube V1, FIG. 4, where the bias voltage in line 75 mixes with A.C. error signal in line 55 (FIGS. 1A and 4) through transformer DO–T36. Since the bias at grid 82 of V2 determines the point at which crossover occurs, the digital-analog bias voltage can change this crossover point accurately over the linear portion of the sine wave of the coarse error signal.

In FIG. 3, the adjustment R9 of offset 83 on the digital-analog card is used to set the starting voltage for the ramp bias voltage that will be generated by the fine counter input 73. In FIG. 3, the output attenuation control 84 is used to set the slope of the ramp voltage so that there is angular correspondence between the bias voltage that is generated, line 73, from the fine system and the coarse A.C. signal in line 55, that is applied at the (null cross detector) input of NCD 53.

FIG. 5 shows the polarity flip-flop inputs for the pins 112 and 116 in FIG. 3.

For coarse A.C. signals greater than ±¼ of the fine electrical cycle, K1 relay passes coarse D.C. polarity signal to inverter system 85. For coarse A.C. signals less than ±¼ of the fine cycle, K1 relay passes fine D.C. polarity signal to inverter system 85.

The polarity signal sets a 0 or −4 volt signal on the output of inverters $A_1$ and $A_2$ (0 in $A_1$ causes 4V at $A_2$) (−4V at $A_1$ causes 0 at $A_2$).

Reset pulse sets flip flop C to a 0 or 1 state depending on state of inverters $B_1$ and $B_2$.

Outputs of $D_1$ and $D_2$ are 0 and −4V or −4V and 0 respectively.

I claim:

1. An analog-digital converter comprising fine and coarse position measuring transformers [each having]

(a) relatively stationary and movable transformer *members for each of said fine and course position measuring transformers,*

(b) a mechanical analog input for said movable members, (c) [fine and coarse null crossing detectors] *a fine null crossing detector connected to said fine position measuring transformer, and a coarse null crossing detector connected to said coarse position measuring transformer;* and (d) fine and coarse gates controlled [thereby,] *respectively by said fine and coarse null crossing detectors,*

(e) said fine and coarse gates respectively controlling inputs to fine and coarse counters, (f) said fine and coarse detectors having inputs respectively from (g) the signal outputs of said fine and coarse movable members, (h) said signal outputs acting as stop signals for said gates respectively, (i) first means providing (1) a polyphase input for said relatively stationary transformer members, said polyphase input having time phase different in polyphase windings of said last mentioned transformer members, (2) a reference start signal for said gates, (3) fine and coarse pulses controlled by said fine and coarse gates respectively, (j) said gates having an output of a number of pulses representing the position of said mechanical analog input, and (k) second means providing a bias voltage to said coarse null crossing detector proportional to the count of said fine counter.

2. An analog-digital converter according to claim 1, said first means providing (a) coarse clock means providing the polyphase input of sub-paragraph 1, the reference start signal of sub-paragraph 2 and the coarse pulses of sub-paragraph 3, with (b) a separate fine clock supplying fine pulses controlled by said fine gate, (c) said fine pulses having over-resolution by a certain factor, and (d) means for reducing the pulse input to said fine counter by the same factor.

3. An analog-digital converter according to claim 1, said first means providing (a) coarse clock means providing the polyphase input of sub-paragraph 1, the reference start signal of sub-paragraph 2 and the coarse pulses of sub-paragraph 3, with (b) a separate fine clock supplying fine pulses controlled by said fine gate, (c) said fine pulses having over-resolution by a certain factor, and (d) means for reducing the pulse input to said fine counter by the same factor, (e) said coarse clock means and said fine clock being independent sources of pulses, (f) the over-resolution of the fine pulses and division thereof being operative to reduce the ambiguity in the fine count due to variation in the ratio of the frequencies of the coarse and fine pulses.

4. An analog-digital converter according to claim 1, (a) said mechanical analog input being in the form of a shaft, (b) said transformers each having a rotor on said shaft, (c) said fine transformer having a larger number of poles than said coarse transformer.

5. An analog-digital converter according to claim 1, and a delay line for setting the start signal for said coarse gate to occur midway between two consecutive coarse pulses.

References Cited

The following references, cited by the Examiner, are of record in the patented file of this patent or the original patent.

UNITED STATES PATENTS

| | | | |
|---|---|---|---|
| 3,191,010 | 6/1965 | Tripp et al. | 235—155 |
| 3,226,710 | 12/1965 | Tripp | 340—347 |

MAYNARD R. WILBUR, *Primary Examiner.*